UNITED STATES PATENT OFFICE 2,212,146

PREPARATION OF ALPHA-ALKYLENIMINES, E. G., ETHYLENIMINE

Gerard Jean Berchet, Wilmington, Del., assignor to E. I. du Pont de Nemours & Company, Wilmington, Del., a corporation of Delaware No Drawing. Application March 10, 1939, Serial No. 261,116

2 Claims. (Cl. 260—239)

This invention relates to the preparation of alkylenimines, more particularly to ethylenimine.

Ethylenimine has been prepared (Wenker, J. Am. Chem. Soc. 57 2328 (1935); British Patent 460,888) by the reaction of alkalies with sulfuric acid esters of alkanolamines. This process is attended with certain disadvantages, e. g. the sulfuric acid ester being formed from sulfuric acid and the ethylenimine tends to be contaminated with decomposition products from which it must be freed by crystallization before the alkali reaction. The over all yield is also low, being about 19%.

Ethylenimine has also (Gabriel Ber. 28 2929 (1895)) been prepared by the reaction of beta-bromoethylamine with alkali. This process is also disadvantageous because of the low yield (about 37%), the cost of the bromoamine and the difficulty of preparing the same.

This invention has as an object the provision of an improved process for the preparation of ethylenimine. A further object is to provide a commercially operable process which avoids the intermediate preparation of the monoethanolamine sulfuric acid ester. A still further object is to provide a process giving higher yields than those obtained hitherto. Other objects will appear hereinafter.

These objects are accomplished by the following invention wherein monoethanolamine is reacted with hydrochloric acid under pressure to give beta-chloroethylamine hydrochloride, which is then dehydrohalogenated by means of alkali to ethylenimine.

The process of this invention comprises two steps, represented respectively by the following equations:

I. 

II. 

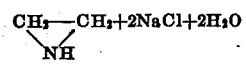

The reaction of the first step is preferably carried out under pressure; the corrosive action of hydrochloric acid may be avoided by using a glass or porcelain lined autoclave, or by using the device described below under Example I. It is not necessary to purify or even isolate the beta-chloroethylamine resulting from Step I. The crude product is used as such in Step II.

The more detailed practice of the invention is illustrated by the following example, wherein parts given are by weight. There are of course many forms of the invention other than these specific embodiments.

*Example I*

Seven hundred thirty-two parts of monoethanolamine are placed in a reaction vessel of "Pyrex" glass fitted with a ground glass stopper bearing a capillary tube of about 1 mm. bore and 30 cm. length, and treated cautiously with 2800 parts of concentrated hydrochloric acid. The solution is then saturated with hydrogen chloride at 0° C., the stopper securely fastened to the reaction vessel and this placed in an autoclave containing oil as heat transfer medium. An inert gas such as nitrogen is introduced into the autoclave until a pressure of 200 to 400 pounds per square inch is attained. The autoclave is then heated at 190° C. for 4 to 8 hours, whereupon the internal pressure rises to about 700 lbs. After cooling, the pressure is slowly released. No corrosion of the autoclave occurs, for gases under pressure diffuse very slowly through capillaries and the amount of hydrogen chloride leaking out of the reaction vessel is negligible. The dark solution is then partially or completely evaporated under reduced pressure to remove the excess hydrochloric acid. The beta-chloroethylamine hydrochloride is obtained as a light brown, hygroscopic, crystalline material.

The crude product of Step I is redissolved in about 500 parts of water. In a vessel fitted with reflux condenser, stirrer, dropping funnel and thermometer is placed 6930 parts of a 27% solution of sodium hydroxide. This represents about a 50% excess over the calculated amount of alkali. The concentration of this solution is important, and, to insure smooth reaction, its specific gravity should be about the same as that of the beta-chloroethylamine hydrochloride solution unless special measures can be taken such as by pressure spraying of a lighter chloroamine solution under the surface of a heavier alkali solution. For the case of a heavier chloroamine solution, jet admixture plus superstirring will allow proper admixture. The use of solutions of approximately equal specific gravity is, however, greatly preferred because of the resulting simplicity of operation. The caustic solution is now heated to 60° C., when external heating is discontinued, and the choloroethylamine hydrochloride solution is run in with stirring at such a rate as to keep the internal temperature between 60 and 70° C. When all is added, the reflux condenser is replaced by a downward condenser and the product distilled. The distillate is a mixture of water and ethylenimine. After collecting about 1000 parts, the distillate is still alkaline but contains no appreciable amount of ethylenimine. It is essential that no unchanged beta-chloroethylamine be allowed to pass into the distillate, for it is a powerful catalyst which causes sudden and violent polymerization of the ethylenimine. This is avoided by using a reflux condenser during the addition of the beta-chloroethylamine hydrochloride solution rather than allowing the ethylenimine to distill off as soon as it is formed.

Ethylenimine may be isolated from the aqueous distillate by treatment with solid sodium hydroxide with cooling, whereupon the ethylenimine separates on top of the aqueous layer. It is dried over sodium hydroxide and distilled, collecting the fraction which boils at 56–75° C. On redistillation, over 95% of this fraction boils at 56–56.5° C., at 760 mm. and consists of pure ethylenimine. The yield is 70–75% of the theory based on the monoethanolamine used. A further amount of ethylenimine is obtained by again treating the residue of this distillation with sodium hydroxide and distilling the upper layer. The alkaline liquors resulting from the isolation and drying of the ethylenimine may be used for a subsequent dehydrohalogenation, after being adjusted to the proper concentration.

In the step of the process wherein monoethanolamine is reacted with hydrochloric acid the pressure and temperature may be varied widely, since beta-chloroethylamine hydrochloride is stable in acidic solution. In general, the conditions outlined above are sufficient to insure complete conversion. More drastic conditions may be used if desired, although the temperature should preferably not exceed 225° C.

The hydrochlorination step is operative at temperatures of 140° to 225° C. and pressures above 100 lbs. per sq. in. Lower temperatures and pressures require longer times of reaction. However, it is preferred that the process be conducted at 175° to 200° C. and pressures of at least 400 lbs. per sq. in. Temperatures of 175° to 190° C. and pressures of at least 500 lbs. per sq. in. give best results. If the amount of acid introduced is only slightly in excess of the calculated quantity, it is not necessary to remove the excess acid from the reaction product prior to treatment with the alkali.

In Step II, alkaline agents other than sodium hydroxide may be used, for example, potassium hydroxide, alkaline earth oxides and hydroxides such as lime or baryta, and alkali carbonates. The alkali may be added to the chloroalkylamine hydrochloride instead of the reverse method described, although this latter is the preferred method. The conditions of temperature may be varied somewhat but it is preferable to operate between 50 and 100° C., and stirring is recommended to insure a rapid reaction. For the same reason, as stated above, the specific gravity of the alkaline solution should be adjusted so as to be substantially the same as that of the chloroethylamine hydrochloride solution.

The process while described in detail with regard to the preparation of ethylenimine per se is generally applicable to the preparation of ethylenimines, i. e., alpha alkylenimines. These have the formula

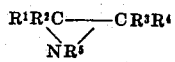

wherein the R's may be the same or different and may be hydrogen or a monovalent hydrocarbon radical, i. e., and alkyl, aryl, aralkyl, alkaryl, or alicyclic radical. These are prepared from the the hydrochlorides of the corresponding compounds having a chlorine atom and a primary or secondary amino group on adjacent carbon atoms. These are in turn prepared from the hydroxy amino compounds having the hydroxyl and the primary or secondary amino groups on adjacent carbon atoms. The preferred starting materials are those having a hydroxyl group and, preferably, a primary amino group on adjacent carbons of a completely saturated open chain compound. The preferred starting materials give ethylenimines preferably having not more than two substituents (other than hydrogen) on the ethylenimine

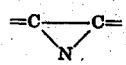

nucleus. Of these, those of the formula

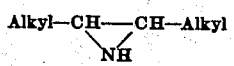

are particularly desirable.

The process is thus applicable to the preparation, inter alia, of N-methylethylenimine, N-ethylethylenimine, N-propylethylenimine, N-dodecylethylenimine, N-hexadecylethylenimine; to C-methylethylenimine, C-ethylethylenimine, C-propylethylenimine, C-hexadecylethylenimine, 1,2-dimethylethylenimine, 1,2-diethylethylenimine and 1,2-dipropylethylenimine.

This invention provides a convenient and inexpensive process for preparing alpha-alkylenimines, i. e., ethylenimines, particularly ethylenimine per se in high yield. Ethylenimine is used as a modifying agent for cellulose, as an agent in the treatment of leather or proteins, as an absorbent for weak acids, and as starting materials for numerous derivatives. The other ethylenimines may be used for some of these purposes.

The processes which have been published and patented for preparing alkylenimines, particularly ethylenimine, by alkaline decomposition of the sulfuric acid esters of alkylolamines have the disadvantage that the sulfuric acid esters of alkylolamines are likely to char and decompose during their formation and must be isolated and purified by crystallization before the subsequent alkaline treatment. Further, the alkaline decomposition is not altogether smooth, according to published descriptions, and the yields are quite low, e. g., an over-all yield of ethylenimine of about 19%. In the process of the present invention, on the other hand, it is quite unnecessary to isolate the intermediate chloroethylamine hydrochloride and the dehydrohalogenation proceeds quite smoothly under the conditions described above. The hydrochlorination step of the present invention is a substantial improvement over processes which make use of thionyl chloride to arrive at the beta-chloroalkylamine hydrochlorides; the use of the expensive thionyl chloride is avoided and the reaction time considerably shortened. Since the reaction is carried out in a closed vessel, no loss of ethanolamine can take place as occurs if the reaction is conducted at atmospheric pressure in a stream of hydrogen halide. Further advantages of this invention lie in the facts that the over-all yields are considerably higher than any reported hitherto, that it requires a minimum of attention and time and that it is well adapted to large scale operation.

The above description and examples are intended to be illustrative only. Any modification of or variation therefrom which conforms to the spirit of the invention is intended to be included within the scope of the claims.

I claim:

1. Process for making ethylenimine which comprises adding beta-chloroethylamine hydrochloride in aqueous solution to an excess of caustic soda in aqueous 27% solution at 50-100° C., the amine hydrochloride solution being of about the same specific gravity and subsequently distilling off the ethylenimine formed.

2. Process for making alpha-alkylenimines which comprises adding a beta-chloroalkylamine hydrochloride in aqueous solution to an excess of caustic soda in aqueous 27% solution at 50-100° C., the amine hydrochloride solution being of about the same specific gravity and subsequently distilling off the alpha-alkylenimine formed.

GERARD JEAN BERCHET.